(12) United States Patent
Ramon et al.

(10) Patent No.: US 7,899,648 B2
(45) Date of Patent: Mar. 1, 2011

(54) SYSTEM AND A METHOD FOR DETERMINING THE REGION SEARCHED BY A MOVING SCENT DETECTOR (ORGAN OR APPARATUS) IN THE PRESENCE OF WIND

(75) Inventors: Jose Caro Ramon, Madrid (ES); Manuel Toledo Lopez, Madrid (ES)

(73) Assignee: GMV Aerospace and Defense S.A., Madrid (ES)

( * ) Notice: Subject to any disclaimer, the term of this patent is extended or adjusted under 35 U.S.C. 154(b) by 419 days.

(21) Appl. No.: 11/947,916

(22) Filed: Nov. 30, 2007

(65) Prior Publication Data
US 2008/0127905 A1 Jun. 5, 2008

(30) Foreign Application Priority Data
Dec. 1, 2006 (EP) .................................. 06125223

(51) Int. Cl.
*G06F 19/00* (2006.01)
*G06F 17/40* (2006.01)
(52) U.S. Cl. ............... 702/187; 340/540; 340/573.1; 340/573.3; 340/989; 701/200
(58) Field of Classification Search ............ 73/23.2, 73/23.34, 31.01, 31.02, 31.03, 170.01, 170.11, 73/170.16, 384; 340/500, 540, 572.1, 573.1, 340/573.2, 573.3, 573.4, 673, 674, 870.01, 340/870.07, 988, 989, 991, 992, 993; 701/1, 701/200, 207, 213, 300; 702/1, 2, 3, 85, 702/104, 127, 187, 188, 189; 715/200, 201, 715/273
See application file for complete search history.

(56) References Cited

U.S. PATENT DOCUMENTS

| | | | | | |
|---|---|---|---|---|---|
| 2,972,742 | A | * | 2/1961 | Ross ......................... | 342/451 |
| 5,060,171 | A | * | 10/1991 | Steir et al. .................. | 345/630 |
| 5,902,343 | A | * | 5/1999 | Hale et al. ................... | 701/50 |
| 5,938,709 | A | * | 8/1999 | Hale et al. ................... | 701/50 |
| 6,029,106 | A | * | 2/2000 | Hale et al. ................... | 701/50 |
| 6,061,618 | A | * | 5/2000 | Hale et al. ................... | 701/50 |
| 6,310,553 | B1 | | 10/2001 | Dance | |

FOREIGN PATENT DOCUMENTS

| | | |
|---|---|---|
| GB | 405694 | 2/1934 |
| WO | 9938015 | 7/1999 |

OTHER PUBLICATIONS

European Search Report dated Apr. 18, 2007.

\* cited by examiner

*Primary Examiner* — Edward R Cosimano
(74) *Attorney, Agent, or Firm* — McCormick, Paulding & Huber LLP

(57) ABSTRACT

A system for determining a region searched (3003, 5001, 5002, 7002, 7003, 8001, 8002, 8003) by a moving scent detector (201) in the presence of wind, said moving scent detector having pre-calibrated scent capabilities, the system comprises: positioning means (101) attached to the moving scent detector for determining a trajectory (3001) followed by the moving scent detector; scent pattern obtainment means for obtaining an oriented scent pattern (2003, 3002, 4001); and, combination means arranged for combining said trajectory and said oriented scent pattern to obtain the region searched by said moving scent detector. The invention also relates to a method for determining a region searched by a moving scent detector in the presence of wind.

18 Claims, 7 Drawing Sheets

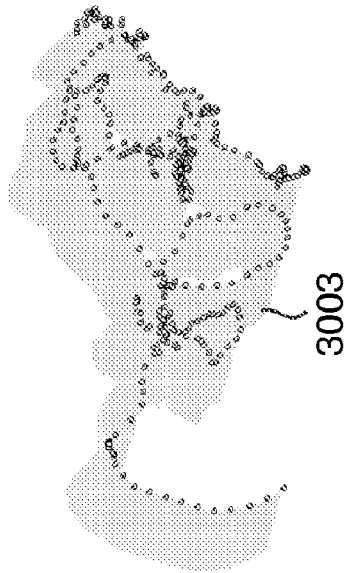
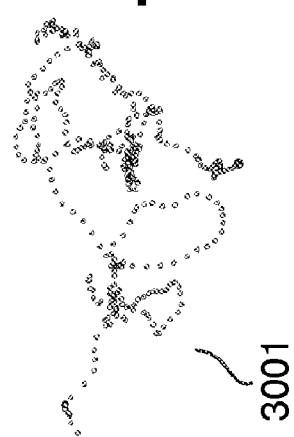
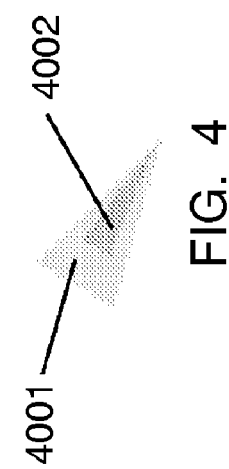
FIG. 3
FIG. 4
FIG. 5

# SYSTEM AND A METHOD FOR DETERMINING THE REGION SEARCHED BY A MOVING SCENT DETECTOR (ORGAN OR APPARATUS) IN THE PRESENCE OF WIND

CROSS REFERENCE TO RELATED APPLICATION

This application is entitled to the benefit of and incorporates by reference essential subject matter disclosed in European Patent Application No. 06125223.5 filed Dec. 1, 2006.

FIELD OF THE INVENTION

The present invention lies in the field of solving the problem of determining the region that has been searched when the primary means used for the looking is the odour of a target as sensed by a moving scent sensor (organ or apparatus) in a location in which the wind might play a determinant role in the transportation of the smell.

Among others, the present invention might be applied in a wide diversity of outdoor searches with trained dogs or pigs: search and rescue of persons or cadavers in collapsed structures, avalanches, landslides or open field, de-mining clearance, search of accelerants in forest fires, search of truffles, drugs finding, search of explosives, search of water, detection of leaks in pipe lines, detection of brown-tree snakes or other animals in cargo or freight, search of damaging insects or detection of poison baits.

BACKGROUND OF THE INVENTION

It has been found that scent is currently been used in many environments as the primary element for searching persons, animals or things that could be hidden in a given region. For this purpose, animals, usually dogs, are trained to detect a specific odour and to move in the region to cover the whole area where the target could be hidden.

When the search is done outdoor, the area covered by a given path will depend on the movement of the dog, its capabilities and some local weather parameters, namely the wind direction and velocity, air temperature, air pressure and air humidity. In case the dog indicates a finding, it is usually not difficult to determine whether the target is in the place where the dog determines or not. However, when no target is found, or if the number of hidden targets is a priori ignored, there is a necessity to conclude if the search region has been thoroughly covered by the different paths followed. Failing in this assessment will impair the results of the search operation, with consequences that will depend on the specific kind of search, ranging from economical losses (search of truffles, damaging insects, leaks in pipes), to unpunished crimes (search of drugs, arson), safety (de-mining, search and rescue, search of snakes), environmental damages (poison baits) or human suffering (search of cadavers).

To determine that the search is exhausted, the operation coordinator has to consider the different trajectories followed during the search as well as the local weather parameters of each trajectory. In case of doubt, and depending on the criticality of the operation, the coordinator is forced to command additional searches to the dog teams, implying distress on the animals and waste of time that could be used in other operations. Although there exist inventions to register and transmit the location of animals, and inventions to register and transmit the local weather conditions, there exist no specific methods and systems conceived to assist the coordinators in the search operations reported above.

The positioning of objects and animals is usually done through the use of GNSS devices, transmitting their position to a central unit by different means.

The determination of local weather conditions is usually done by using weather stations including different technologies to measure wind direction, wind speed, air temperature, pressure and air humidity.

Communication between different devices is usually done using radiofrequency.

U.S. Pat. No. 6,310,553 can be cited as barely related to the present invention: it discloses a positioning means which comprises a GPS and a switch means carried by a search and rescue dog by way of a harness or jacket; the switch means incorporates a pull mechanism or a sound sensitive mechanism which activates the switch mechanism when the dog pulls the pull mechanism or barks. This causes activation of the GPS to record and/or transmit information to identify the position of the positioning means, and thus a person, animal, substance, or article found by the dog.

None of the above inventions and patent documents, taken either singularly or in combination, is seen to describe the instant invention as claimed.

SUMMARY OF THE INVENTION

The invention relates to a system and method for determining the region searched by a moving scent detector (organ or apparatus) in the presence of wind. Preferred embodiments of the system and method are defined in the dependent claims.

The present invention provides a system and a method for determining the region searched or covered by a moving scent detector (organ or apparatus) in the presence of wind, which may be used as support to a coordinator in charge of a specific search in the decision of where to proceed with the search or whether the search operation should be considered finished. The system is also useful during the training of the search teams.

A first aspect of the invention relates to a system for determining a region searched by a moving scent detector in the presence of wind, said moving scent detector having pre-calibrated scent capabilities, wherein the system comprises:

positioning means attached to the moving scent detector (typically a trained animal or any other human-made device) for determining a trajectory followed by the moving scent detector;

scent pattern obtainment means for obtaining an oriented scent pattern; and, combination means arranged for combining said trajectory and said oriented scent pattern to obtain the region searched by said moving scent detector.

Said combination means preferably consists of translation means for translating said oriented scent pattern along the trajectory followed by the moving scent detector.

The system preferably further includes:

local weather parameter obtainment means for obtaining local weather parameters which include at least local wind speed and local wind direction; and, scent pattern defining means for defining said oriented scent pattern and providing it to the scent pattern obtainment means, which scent pattern defining means is arranged to calibrate said scent detector capabilities against said local weather parameters or variables to determine a non-oriented scent pattern and a scent pattern orientation and to produce the oriented scent pattern.

In this case, as indicated before, said local weather parameters are wind direction and wind speed. For some specific operations it could be useful to have also into account other local weather variables, and thus, they may further include local temperature and/or local pressure and/or local humidity.

The local weather parameters obtainment means may include one or more weather stations.

According to another embodiment of the invention, the system further comprises input means associated to the scent pattern obtainment means for entering directly said scent pattern into the system by an external operator, according to his/her assessment of the local weather conditions and his/her knowledge of the capabilities of the scent detector.

In any case, said oriented scent pattern is preferably characterised as a shape, a range and an orientation. Said scent pattern shape may be, for example, a triangle or a circular sector; in which case, the base of the triangle (or the arc of the circle should be the case of a circular sector) is orientated against the wind.

Both the non-oriented scent pattern and its orientation—and thus, the oriented scent pattern—may be time and/or location dependent.

The scent pattern obtainment means and the combination means are preferably implemented in a central unit that processes the preferred input data (trajectory of moving scent detector, pre-calibrated scent capabilities and local weather parameters) and determines the region covered or searched during a search.

The system may further include computation means for determining different quantitative and/or qualitative probabilities of search, considering the tolerance or uncertainty of any of the input data and said calibrations.

And the scent pattern obtainment means may further include separating means for dividing the scent pattern in scent sub-patterns, according to said quantitative and/or qualitative probabilities of search.

The system of the present invention may further include display means for displaying a representation of said region searched by the moving scent detector, that is, some device to show the region covered, such as a display, a printer, or similar. The representation may show the different quantitative and/or qualitative probabilities of the search; that is, the system (preferably the central unit) may modify the region covered depending on the tolerance of the input data, such as for example: uncertainty on the position of the scent detector, on the local weather parameters, and/or on the mapping from local weather parameters into the scent pattern.

The system may further include a device to interact with the operator, such as a keyboard, a touch-screen, a console with buttons or similar. It may also include storage devices to store data received and/or configured and/or computed, or past configurations and operations.

The system might include communication devices to exchange information among the positioning means and the local weather obtainment means to and from the central unit, as a preferred implementation of the scent pattern obtainment means and the combination means.

The system may also be attached to other devices to receive commands and configuration parameters from the operator, to show the said covered area and/or other data, to import images, maps and/or photographs or to print or export data and/or reports.

And, according to this first aspect of the invention, the system uses these components to provide the region that has been covered or searched during one or several searches done with the moving scent detector or detectors.

Although there currently exist positioning devices designed to be carried by animals, e.g., GPS devices, and there currently exists apparatus to determine the air temperature, humidity, pressure and speed and orientation of the wind, namely weather stations, there is no invention specifically designed which combines these elements and provides an orientated scent pattern which is representative of the scent capabilities of a moving scent detector and preferably of the local weather conditions, in order to determine the region searched by the moving scent detector.

The positioning means attached to the moving scent detector may make use of absolute, differential, augmented or assisted GNSS (GPS, GLONASS, Galileo, Beidou Navigation System), or any other location system. The positioning of the moving scent detector may be further complemented by dead reckoning devices. The positioning means may be complemented with additional equipment in the neighborhood or inside the search region, for instance by adding pseudolites or reference beacons.

Data of the positioning means of the moving scent detector and/or the local weather parameters obtainment means are transmitted by some communication means, such as radiofrequency (WIFI, WIMAX, Bluetooth, ZigBee, GSM, GPRS, EDGE, 3G, UMTS, PMR, infrared or any other communication system or protocol, including transponders if needed), cable, sound or ultrasound, or other. Alternatively, such data might be logged locally in those means and be transferred later, although this would impair real time or quasi real time functionalities, but it would still permit post-search analyses and reports.

The computation of the position of the moving scent detector might be done by the positioning means itself or by the central unit using the data transferred from the positioning means. The position might be used in absolute or relative coordinate frameworks. A set of locations of the scent detector, optionally labelled with the time when they were registered, constitutes a scent detector trajectory.

The central unit computes or receives from the positioning means the trajectory followed by the scent detector. The central unit may allow the overlap of different trajectories followed by one or more different scent detectors, providing a single region searched. The central unit may permit the edition of the trajectories to delete, add or modify points, segments or curves of the trajectories.

The local weather parameters obtainment means provide the central unit with the local weather parameters either as direct data transmitted or transferred by the optional weather stations, by operator configuration or by edition of previously recorded conditions.

The central unit may permit to delimit the search zone by direct configuration, recording data from the positioning means or using an additional positioning means. The central unit may permit to edit the search region by deleting, modifying or adding points, segments or curves.

The central unit preferably translates the local weather parameters into an oriented scent pattern (preferably as a shape, range and orientation with respect to the wind) using pre-configured models that combine the local weather parameters with the scent detector capabilities which are predetermined for each moving scent detector, so that an oriented scent pattern can be determined; said oriented scent pattern preferably consists in the range and shape of an area covered by each scent detector from a specific location.

The central unit might permit to tune the oriented scent pattern of the area covered from a point as a function of the local weather parameters for different scent detectors.

The central unit may permit as well to configure directly the scent pattern for a point or points of the trajectory as evaluated by the operator taking into account local weather parameters and his/her experience with the scent detector.

The central unit may interpolate the points of the trajectory or trajectories to fill gaps according to the positioning rate or positioning data availability.

The central unit may permit to overlap a boundary of the search zone, the trajectories and/or the region considered covered or searched with existing images, such as maps or photographs, changing the view-point of the showed trajectory and the region considered searched if needed.

The central unit may permit to show in real time or quasi-real-time the area searched during the search operation; it also permits operation in post-search mode.

The central unit may consider that the weather conditions are time and position dependant, so that the scent pattern computed for each moving scent detector location is calculated taking into account the specific conditions existing when the moving scent detector was in that location at that time.

The central unit may show the area considered searched indicating probability of search by colours, iso-probability lines or other means.

The central unit may permit to add over the region searched the location of detected targets, either directly or as the location of the moving scent detector at a given time. The central unit may permit to edit the location of the detected targets. The central unit may permit to locate targets prior the search, that is, to mark the location of targets which have to be found (this might be useful to follow training exercises, and to analyse and calibrate the capabilities of the scent detector).

The central unit may produce reports of the searches done by the different scent detectors. The central unit may permit to replay at different speeds the searches done and registered.

The central unit may have the capability to store and recover configuration parameters, scent detector capabilities, parameters to map from scent detectors and weather conditions into scent patterns, the searches and reports having into account data such as the scent detector, the operator, the date, the area, etc.

A second aspect of the present invention relates to a method for determining a region searched by a moving scent detector, said moving scent detector having pre-calibrated scent capabilities. According to the invention, the method comprises:

determining a trajectory followed by the moving scent detector;

obtaining an oriented scent pattern, and combining said trajectory and said oriented scent pattern to obtain the region searched by said moving scent detector.

Combining said trajectory and said oriented scent pattern to obtain the region searched by said moving scent detector preferably consists of translating and overlapping said oriented scent pattern along the trajectory followed by the moving scent detector.

Obtaining said oriented scent pattern further comprises:

obtaining a non-oriented scent pattern and a scent pattern orientation by calibrating said scent detector capabilities against local weather parameters which at least include local wind speed and local wind direction.

The method may also consider further local weather parameters which include local temperature and/or local pressure and/or local humidity.

It is also possible that obtaining said oriented scent pattern comprises directly entering said oriented scent pattern.

Preferably, the method further comprises characterising said oriented scent pattern as a shape, a range and an orientation; which shape can be a triangle or a circular sector.

The method further comprises determining different quantitative and/or qualitative probabilities of search considering the tolerance or uncertainty of any of the input data and said calibrations.

Defining said scent pattern may further include dividing the scent pattern in oriented scent sub-patterns, according to said quantitative and/or qualitative probabilities of the search. That is, the scent pattern definition may include different sub-patterns according to the probability of coverage for the local weather parameters and/or the scent detector capabilities.

Said oriented scent pattern can be time- or location-dependent.

The method may further comprise displaying a representation of said region searched by the moving scent detector, which representation may include showing different probabilities of the search.

The method may further comprise defining a search zone, in which case, it may also include comparing said search zone with the region covered or searched by the moving scent detector and providing a comparative output.

The system and method of the present invention, permit, among others:

a. to configure optionally a search zone, as a whole or split in sub-regions;

b. to trace the region covered or searched by one or different scent detectors, e.g., one or different dog teams, overlapping various searches if necessary;

c. to determine which areas need further searches;

d. to analyse and tune the scent detector capabilities, e.g., during the training of a dog or the training of a dog guide;

e. to edit the trajectories, scent capabilities, the region searched and the local weather conditions;

f. to assist the operation coordinator in the decision that the search zone is thoroughly covered, saving effort and time;

g. to analyse the coverage of the search as regards its tolerance to the input data quality (scent detector location, local weather conditions and scent detector capabilities);

h. to optionally overlap the region covered or searched and/or the search zone with images, photographs or maps;

i. to generate reports of the operations done;

j. to replay the operation done for analysis, training and operations analyses and improvement.

As conceived, the present invention is a valuable tool to support scent searches in all its phases:

a. Pre-operation: training, of the operators or guides of the scent detectors, and of the scent detectors themselves (calibration of scent pattern, evolution of the scent detector capabilities).

b. Operation: to support the search coordinator decisions about need of further searches, determination of areas not thoroughly covered.

c. Post-operation: reporting of the operation done, analysis for improvement.

BRIEF DESCRIPTION OF THE DRAWINGS

To complete the description and in order to provide for a better understanding of the invention, a set of drawings is provided. Said drawings form an integral part of the description and illustrate preferred embodiments of the invention, which should not be interpreted as restricting the scope of the invention, but just as examples of how the invention can be embodied. The drawings comprise the following figures:

FIG. 3 shows how a trajectory and an oriented scent pattern combine to determine the area covered.

FIG. 4 shows a scent pattern divided into high and medium probably covered sub-patterns.

FIG. 5 shows how a trajectory and an oriented scent pattern divided into sub-patterns combine to determine the area covered showing different coverage probability.

DETAILED DESCRIPTION OF THE PREFERRED EMBODIMENTS

Figure 1:
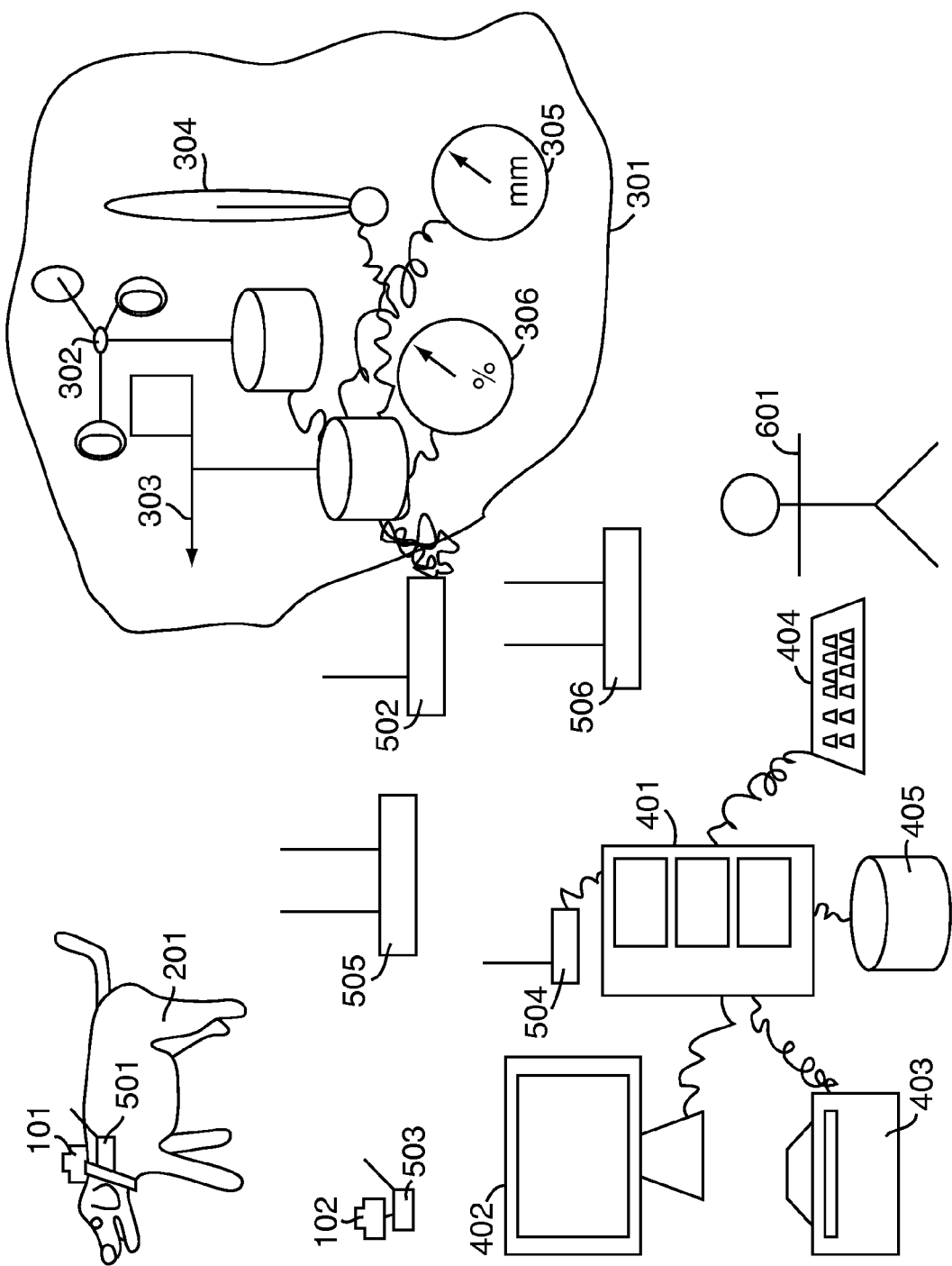
FIG. 1 illustrates the main components of the system, as well as some optional devices.

As shown in FIG. 1, the system consists of a positioning device 101 to locate a search dog 201, a weather station 301, and a central unit 401.

The positioning device 101 may be a GNSS receiver (e.g. a GPS, GLONASS, Galileo, or Beidu), and it might be complemented with a local reference receiver for differential location 102. Other positioning devices are possible.

The primary readings of the weather station are the wind speed and its direction as taken from an anemometer 302 and a weather vane 303. Other possible readings are air temperature using a thermometer 304, air pressure from a barometer 305 or air humidity from a hygrometer 306. Several weather stations could be used to characterize the weather conditions at different locations, for instance if the search region is very big or if the wind is different in different regions of the search area due to the specific environment.

The data from the positioning devices 101 and 102 and from the weather station 301 are transmitted to the central unit 401. This can be done using the radiofrequency emitters 501, 502 and 503 installed at the positioning devices and the weather stations and the radiofrequency receiver 504 installed at the central unit 401. It could be necessary to use one or more transponders 505, 506 to keep the communication link depending on the size of the search region. The communication might be done with different technologies. Note that there are other possibilities for the data transmission, such as cable, ultrasounds, infrared, etc, or even local storage in the devices for post-search transfer.

The central unit 401 includes a device for showing the area covered by the search. This may be a display 402, a printer 403 or similar devices. The central unit permits the interaction with a system operator 601 by a keyboard 404 or other devices such as a console with knobs, buttons, handles, a mouse, a touch screen or similar. The central unit 401 may be attached to a storage device such as a hard disk 405, a flash memory or similar device.

Figure 2:
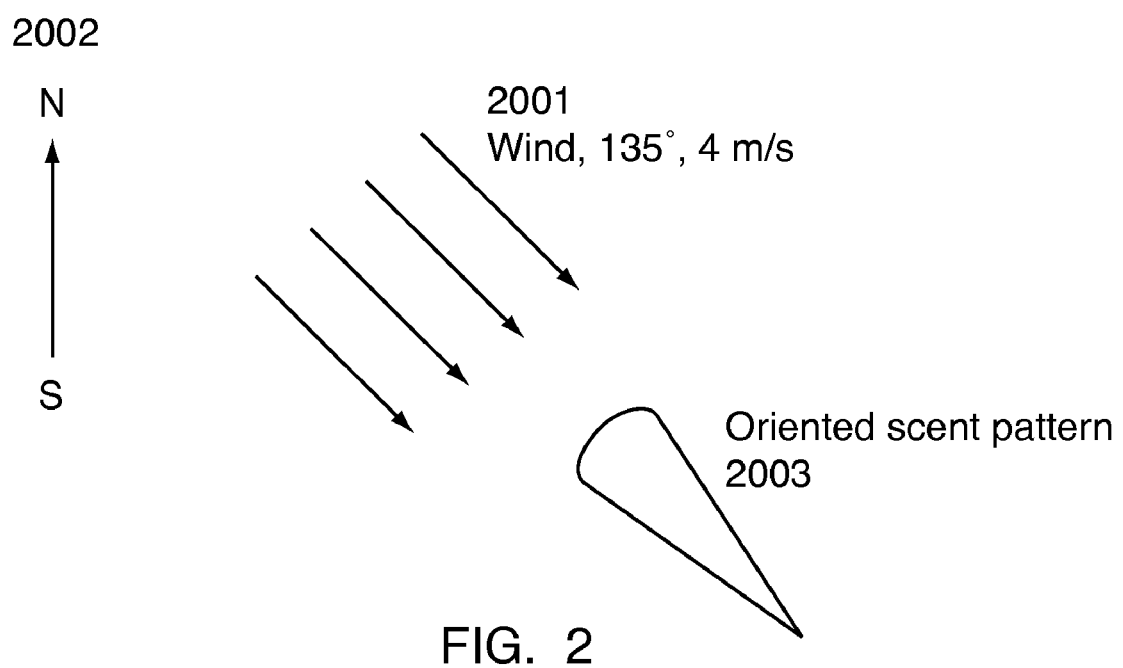
FIG. 2 shows and example of oriented scent pattern, with the shape of a circular sector.

The basis of the method for determining the area covered during the search is to translate the local weather conditions and the scent capabilities into an oriented search pattern. This is shown in FIG. 2. In this specific example, the wind 2001 has a direction of 135 degrees with respect to the geographical north 2002. For specific dog capabilities and target, as calibrated during the training, it was determined that for these wind conditions the scent pattern 2003 is properly described as a circular sector of 25 degrees of central angle and a radius of 6 metres (the numbers are just examples to be calibrated during the training). Other basic pattern shapes are possible, such as isosceles triangles (as shown, for example, in FIG. 6), or other shapes.

The central unit builds the area covered by the dog during the search combining the trajectory of the dog with the oriented scent pattern, as shown in FIG. 3: the trajectory 3001 and an oriented triangular scent pattern 3002 lead to the covered area 3003.

The central unit may permit to configure the scent pattern including sub-patterns with different qualitative or quantitative search probability. This is exemplified in FIG. 4: the outer region 4001 (light grey) represents the area covered with medium probability, and the inner region 4002 (dark grey) shows the area with high probability of coverage. FIG. 5 shows how the covered area already depicted in FIG. 3 would lead in this case to regions with different probability of successful coverage during the search; in FIG. 5 the dark grey area 5002 shows the region searched with high probability, whilst the light grey area 5001 shows the region searched with medium probability. There are several possibilities to show the probability of coverage, such as isoprobability contours, colours, fill patterns, etc.

Figure 6:
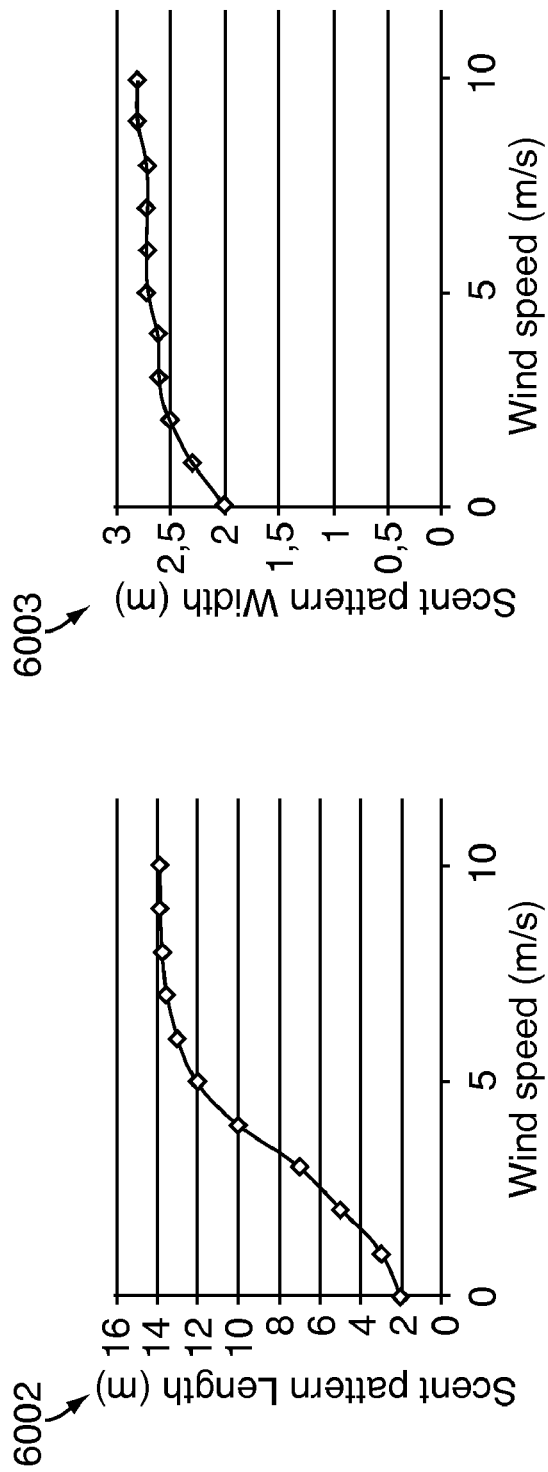
FIG. 6 depicts an example of calibration of the range of a non-oriented triangular scent pattern as a function of the wind speed.
Figure 6:
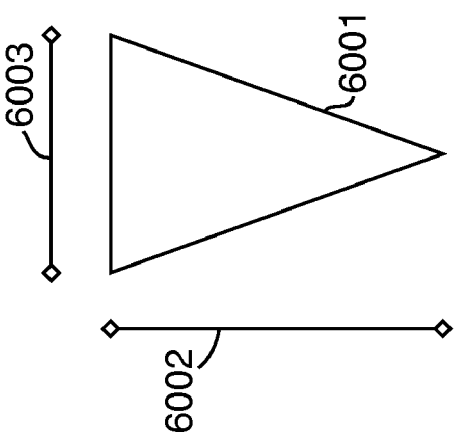

The central unit may permit that the capabilities of a scent detector are calibrated according to the weather conditions. For instance, FIG. 6 shows a possible calibration of a non-oriented isosceles triangular scent pattern 6001 as a function of the wind speed for a specific dog. The figure shows two graphics with calibration points: the left-hand graphic governs the length 6002 of the scent pattern (in this case the altitude of the triangle) and the right-hand graphic its width 6003 (in this case the base of the triangle). The central unit may then determine the oriented scent pattern for a specific wind speed and direction interpolating the calibrated data and rotating the shape so that the base of the triangle is orientated against the wind, thereby reflecting the potential points of origin of the odour emanated from the target detected by the dog, taking into account the drift by the wind. Dependencies on other parameters, such as air temperature, humidity and pressure, could be taken into account additionally if they are relevant for the scent detector.

The central unit may take into account that the weather conditions are time and position dependant, so that the scent pattern computed for each dog location is calculated taking into account the specific conditions existing when the dog was in that location at that time.

Figure 7:
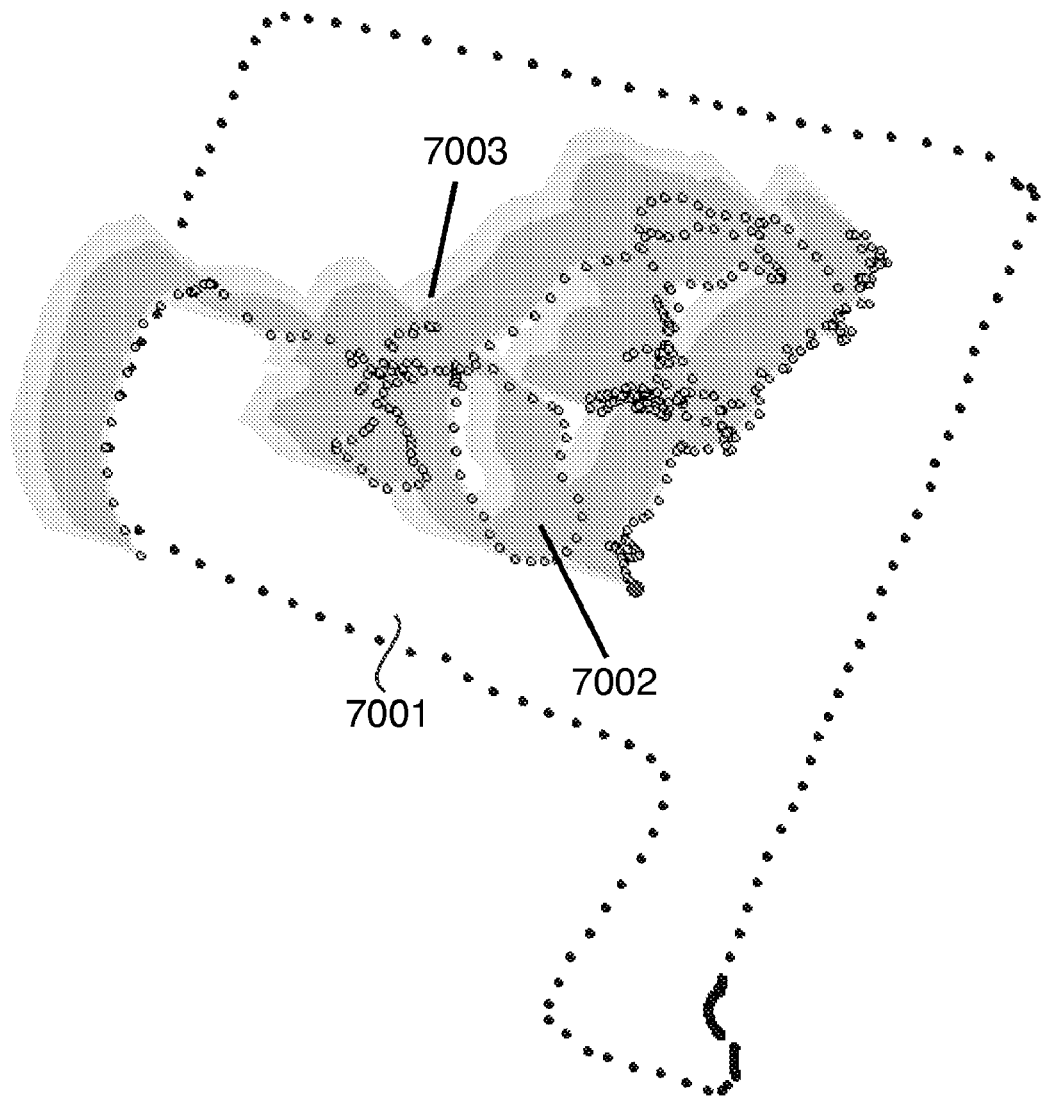
FIG. 7 shows the covered area inside a search region.

The system may permit to configure a search region, so that the area that has not been searched may be shown. There are several possible ways of configuring the search region, such as direct draw of the area by the operator, using the positioning device attached to the dog to walk around the search region, using an additional positioning device, combination of the methods indicated, etc. FIG. 7 shows a search region 7001 and the area that has been considered covered by the search with high 7002 and medium 7003 probability for a given search operation.

The system computes the coverage combining oriented scent patterns and trajectories. The preferred way of obtaining scent patterns is to combine local weather conditions and scent detector capabilities as described above. However, it is also possible that the operator configures directly the shape, range and orientation of the scent pattern having into account his/her experience with the scent detector capability and his/ her assessment of the local weather conditions. For instance, the operator would configure shape and range of the scent pattern and the direction of the wind as observed using external means. In that case the weather station would not be needed.

Figure 8:
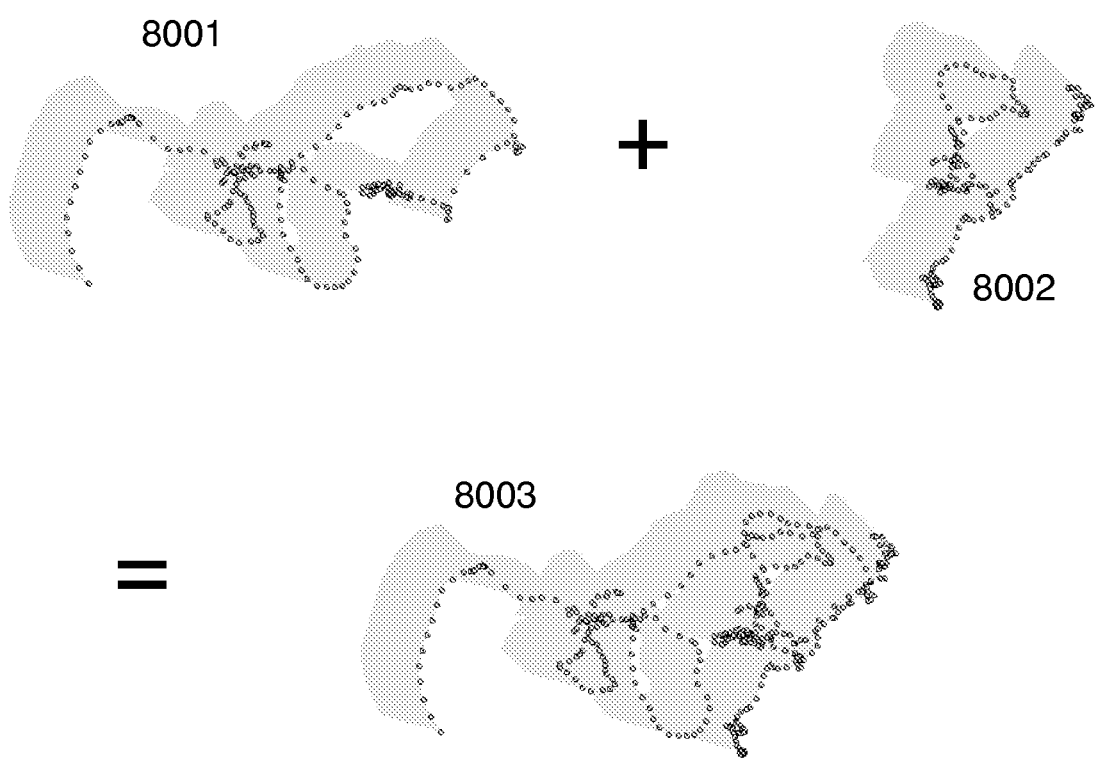
FIG. 8 exemplifies how two covered areas resulting from two different searches are combined in a single covered area.

The central unit may overlap different covered areas from the same or different scent detectors in an additive way, to build a single picture of the area covered by different individual searches, as exemplified in FIG. 8, where the covered area 8001 is joint with the covered area 8002 to produce the single covered area 8003.

Figure 9:
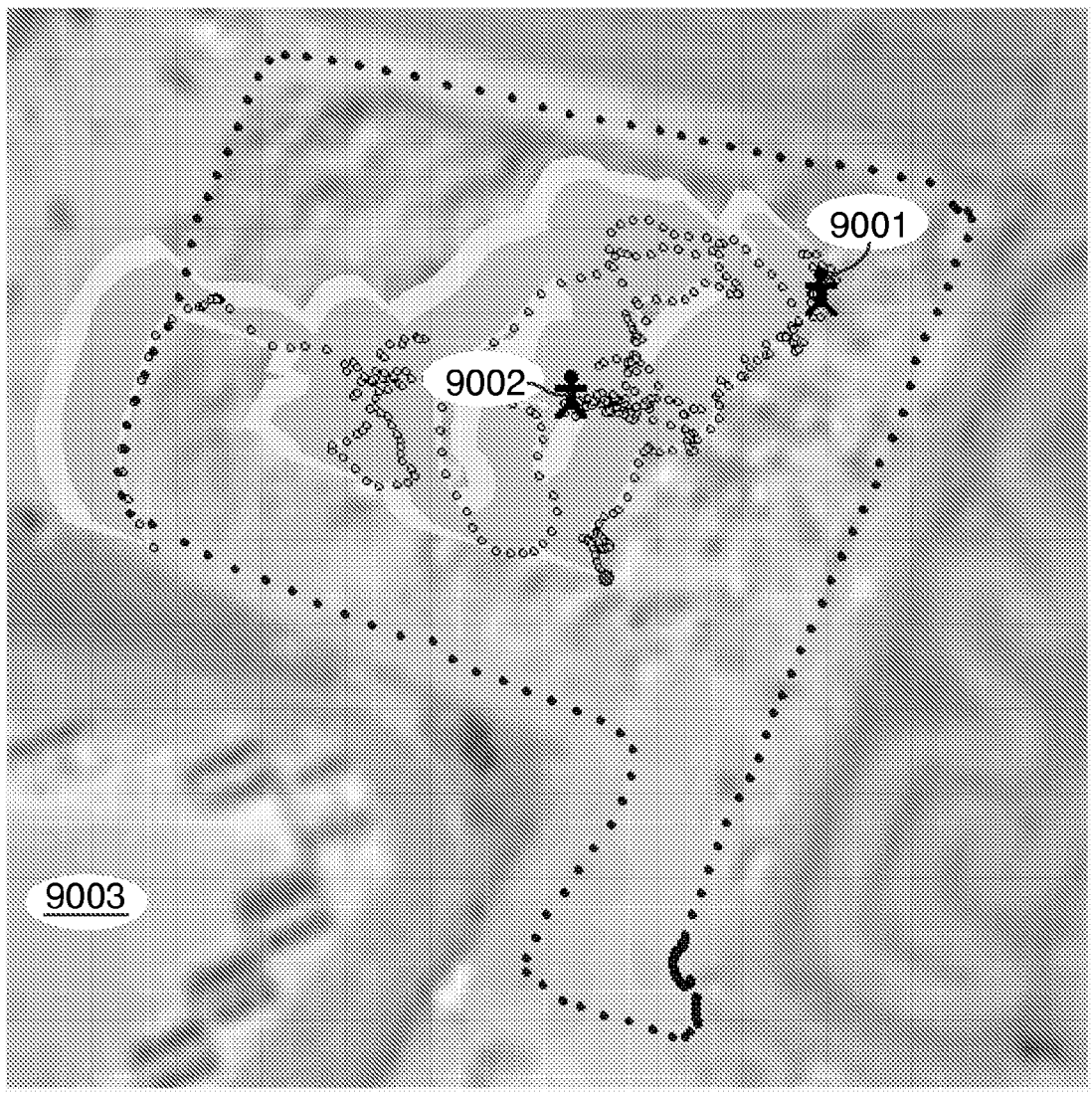
FIG. 9 exemplifies targets and photographs added to the covered area.

The central unit may permit to add targets 9001, 9002 (symbols representing the object or person being searched) over the search region, as exemplified in FIG. 9. This might be done directly by the operator, or linking the instant when the dog finds its target with the dog location. The addition of targets may be done during the search, or a priori during training.

The central unit may permit to import images, figures, maps or photographs of the search region to overlap on top of them the search region boundary, trajectories, searched areas and or targets linked to the search operation, as exemplified in FIG. 9 with a photograph 9003 of the search region.

The central unit may generate reports with the area covered during the different searches and/or the data collected during the operation, such as date, time, number of trajectories overlapped, number and location of targets founds etc.

The central unit may show the result in real time, quasi-real time (short delays) and/or in post-search modes.

The central unit may permit to replay operations for training purpose. This can be done for instance adding controls for the operator to select to replay the operation at a given speed.

The central unit may permit the computation of the region searched with different probabilities considering the uncertainty of the input parameters, such as wind speed and wind direction, uncertainty of the scent detector location, scent detector capabilities, etc.

The central unit may include functionalities to edit all relevant received data and configured parameters, to add, delete or modify: search region, local weather conditions, scent pattern, trajectories, area searched, number and location of targets, etc.

The central unit may permit to store and recover the data collected or processed during the different search operations.

As indicated before, the present invention relates to a system and a method for determining the region searched by a moving scent detector (organ or apparatus) in the presence of wind. It is to be understood that the above disclosure is an exemplification of the principles of the invention and does not limit the invention to the illustrated embodiments.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A system for determining a region searched by a moving scent detector in the presence of wind, said moving scent detector having pre-calibrated scent capabilities, the system comprises:
    positioning means attached to the moving scent detector for determining a trajectory followed by the moving scent detector;
    scent pattern obtainment means for obtaining an oriented scent pattern; and,
    combination means arranged for combining said trajectory and said oriented scent pattern to obtain the region searched by said moving scent detector.

2. The system according to claim 1, wherein said combination means includes translation means for translating said oriented scent pattern along the trajectory followed by the moving scent detector.

3. The system according claim 1, wherein it further comprises input means associated to the scent pattern obtainment means for entering directly said scent pattern into the system by an external operator.

4. The system according to claim 1, wherein it further comprises:
    local weather parameter obtainment means for obtaining local weather parameters which include at least local wind speed and local wind direction; and,
    scent pattern defining means for defining said oriented scent pattern and providing it to the scent pattern obtainment means, which scent pattern defining means is arranged to calibrate said scent detector capabilities against said local weather parameters to determine a non-oriented scent pattern and a scent pattern orientation and to produce the oriented scent pattern;
    wherein the system includes computation means for determining different quantitative and/or qualitative probabilities of search which are arranged to consider the tolerance or uncertainty of the trajectory of the moving scent detector and of said scent pattern; and,
    wherein said computation means are arranged to further consider the tolerance or uncertainty of said calibrations and/or said local weather parameters.

5. The system according to claim 1, wherein said oriented scent pattern is time-dependent.

6. The system according to claim 1, wherein said oriented scent pattern is location-dependent.

7. The system according to claim 1, wherein it further comprises display means for displaying a representation of said region covered by the moving scent detector.

8. The system according to claim 1, wherein two or more scent detector trajectories are added to provide a single region searched.

9. The system according to claim 1, wherein said oriented scent pattern is characterised by a shape, a range and an orientation.

10. The system according to claim 9, wherein said scent pattern shape is a triangle or a circular sector.

11. The system according to claim 1, wherein the system further includes defining means for defining a search zone.

12. The system according to claim 11, wherein the system further comprises comparing means for comparing said search zone with the region searched by the moving scent detector and providing a comparative output.

13. The system according to claim 1, wherein it further comprises:
    local weather parameter obtainment means for obtaining local weather parameters which include at least local wind speed and local wind direction; and,
    scent pattern defining means for defining said oriented scent pattern and providing it to the scent pattern obtainment means, which scent pattern defining means is arranged to calibrate said scent detector capabilities against said local weather parameters to determine a non-oriented scent pattern and a scent pattern orientation and to produce the oriented scent pattern.

14. The system according to claim 13, wherein said local weather parameters further include local temperature and/or local pressure and/or local humidity.

15. The system according to claim 13, wherein said local weather parameters obtainment means include one or more weather stations.

16. The system according to claim 1, wherein the system includes computation means for determining different quantitative and/or qualitative probabilities of search which are arranged to consider the tolerance or uncertainty of the trajectory of the moving scent detector and of said scent pattern.

17. The system according to claim 16, wherein said scent pattern obtainment means includes separating means for dividing the scent pattern in scent sub-patterns, according to said quantitative and/or qualitative probabilities of the search.

18. The system according to claim 16, wherein said representation shows different probabilities of the search.

* * * * *